United States Patent
Rezvani et al.

(10) Patent No.: US 6,760,434 B1
(45) Date of Patent: Jul. 6, 2004

(54) DUAL IMPEDANCE HYBRID

(75) Inventors: Behrooz Rezvani, San Ramon, CA (US); Fu-Ho Lee, San Ramon, CA (US)

(73) Assignee: Ikanos Communications, Inc., Fremont, CA (US)

( * ) Notice: Subject to any disclaimer, the term of this patent is extended or adjusted under 35 U.S.C. 154(b) by 729 days.

(21) Appl. No.: 09/598,012

(22) Filed: Jun. 20, 2000

Related U.S. Application Data

(60) Provisional application No. 60/172,969, filed on Dec. 21, 1999, provisional application No. 60/166,676, filed on Nov. 19, 1999, and provisional application No. 60/161,788, filed on Oct. 27, 1999.

(51) Int. Cl.[7] .................................................. H04M 9/08
(52) U.S. Cl. .................... 379/402; 379/390.4; 379/394; 379/398
(58) Field of Search ........................... 379/399.01, 402, 379/403, 390.04, 398

(56) References Cited

U.S. PATENT DOCUMENTS

| | | | |
|---|---|---|---|
| 4,178,569 A | * 12/1979 | Reutter et al. | ............... 379/402 |
| 5,825,819 A | 10/1998 | Cogburn | |

* cited by examiner

Primary Examiner—Minsun Oh Harvey
Assistant Examiner—Jefferey Harold

(74) Attorney, Agent, or Firm—IP Creators; Charles C. Cary

(57) ABSTRACT

A method and apparatus for coupling an xDSL transceiver with a subscriber line is disclosed. A hybrid circuit is disclosed which exhibits a different relative gain factor for transmitted signals and received signals. The difference in gain factors results in part from a combined balance circuit and transformer which exhibit a different coupling ratio between the primary and secondary coils on the receive path and the transmit path. The hybrid circuit may be used to isolate the receive signal from the transmit signal in the full duplex mode of operation. The gain from the transmit port to the receive port is minimum and most of the energy is transmitted to the subscriber line.

In an embodiment of the invention a hybrid circuit for communicating a transmit signal and a receive signal across a subscriber line is disclosed. The hybrid circuit includes: a transformer and a balance circuit. The transformer includes a primary inductor and a secondary inductor and the secondary inductor for coupling to the subscriber line and the primary inductor including at least two inductive portions. The balance circuit includes a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal. In an alternate embodiment of the invention a method for communicating a transmit signal and a receive signal across a subscriber line is disclosed.

12 Claims, 6 Drawing Sheets

Tx

Rx

Tx

Rx

DUAL IMPEDANCE HYBRID

CROSS REFERENCE TO RELATED APPLICATION

This application claims the benefit of prior filed co-pending Provisional Application No. 60/172,969 entitled "METHOD OF REDUCING TRANSMIT CROSS-TALK POWER IN THE RECEIVER PATH OF ADSL AND VDSLU" and filed on Dec. 21, 1999 and co-pending Provisional Application No. 60/166,676 entitled "DUAL IMPEDANCE TRANSCEIVER" filed on Nov. 19, 1999 and co-pending Provisional Application No. 60/161,788 entitled "DUAL IMPEDANCE TRANSCEIVER" filed on Oct. 27, 1999. Each of the above-cited applications is incorporated herein by reference in its entirety.

BACKGROUND OF THE INVENTION

1. Field of Invention

This invention relates generally to communications, and more particularly, to an digital subscriber line (xDSL) line hybrid circuit.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: ADSL, VDSL, HDSL all of which are broadly identified as xDSL have been developed to increase the effective bandwidth of existing subscriber line connections, without requiring the installation of new fiber optic cable.

Discrete Multi-Tone (DMT) is a multicarrier technique that divides the available bandwidth of twisted-pair connections into many sub channels. The DMT technique has been adopted by the ANSI TIE1.4 (ADSL) committee for use in ADSL systems. In ADSL, DMT is used to generate 250 separate 4.3125 kHz sub channels from 25.875 kHz to 1.104 MHz for downstream transmission to the end user, and 26 sub channels from 25.875 kHz to 138 kHz for upstream transmission by the end user. The transmission capability of the individual sub channels are evaluated for each connection, and data is allocated to the sub channels according to their transmission capabilities (the number of bits each sub channel can support). Sub channels that are not capable of supporting data transmission are not used, whereas the bit-carrying capacity of sub channels that can support transmission is maximized. Thus, by using DMT in an ADSL system, the transmission capability of each subscriber line is maximized over the fixed bandwidth.

Generally, the implementation of the ADSL sub channels occurs in highly integrated digital circuits which provide a low voltage, low current output signal carrying the information for each needed channel. This low level output signal is, generally, interfaced to a subscriber line through a hybrid circuit coupled to a transformer. A hybrid circuit allows real-time full-duplex data transfer. The coupling transformer is used mainly for the purpose of longitudinal signal isolation, surge protection and impedance. A hybrid circuit can provide some undesirable amount of transmission loss from the transmitting path to the receiving path. On a voice line this feedback exhibits itself as an echo or as crosstalk. For a data line these effects create an undesirable degradation of the signal integrity. For real-time full-duplex data transmission applications, the amount of this crosstalk must be minimized to insure the integrity of the data transmission.

Therefore, the need exists for a hybrid which reduces crosstalk and echo between the transmit and receive paths.

SUMMARY OF THE INVENTION

A method and apparatus for coupling an xDSL transceiver with a subscriber line is disclosed. A hybrid circuit is disclosed which exhibits a different relative gain factor for transmitted signals and received signals. The difference in gain factors results in part from a combined balance circuit and transformer which exhibit a different coupling ratio between the primary and secondary coils on the receive path and the transmit path. The hybrid circuit may be used to isolate the receive signal from the transmit signal in the full duplex mode of operation. The gain from the transmit port to the receive port is minimum and most of the energy is transmitted to the subscriber line.

In an embodiment of the invention a hybrid circuit for communicating a transmit signal and a receive signal across a subscriber line is disclosed. The hybrid circuit includes: a transformer and a balance circuit. The transformer includes a primary inductor and a secondary inductor and the secondary inductor for coupling to the subscriber line and the primary inductor including at least two inductive portions. The balance circuit includes a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal.

In an alternate embodiment of the invention a method for communicating a transmit signal and a receive signal across a subscriber line is disclosed. The method for communicating comprises the acts of:

forming at least a first inductive coupling and a second inductive coupling with the subscriber line;

coupling a plurality of resistive elements to form opposing sides of a balance circuit with opposing ends, and with each of the opposing sides including a corresponding one of the first inductive coupling and the second inductive coupling;

interfacing with the opposing sides of the balance circuit to form a receive interface for outputting the receive signal and the receive interface exhibiting a first induced emf resulting from the receive signal on the subscriber line; and interfacing with opposing ends of the balance circuit to form a transmit interface for inputting the transmit signal and the transmit interface exhibiting a second induced emf on the subscriber line resulting from the transmit signal and the first induced emf differing in magnitude relative to the second induced emf.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A hybrid circuit is disclosed which exhibits a different relative gain factor for transmitted signals and received signals. The difference in gain factors results in part from a combined balance circuit and transformer which exhibit a different coupling ratio between the primary and secondary coils on the receive path and the transmit path. The hybrid circuit may be used to isolate the receive signal from the transmit signal in the full duplex mode of operation. The gain from the transmit port to the receive port is minimum and most of the energy is transmitted to the subscriber line.

Figure 1A:
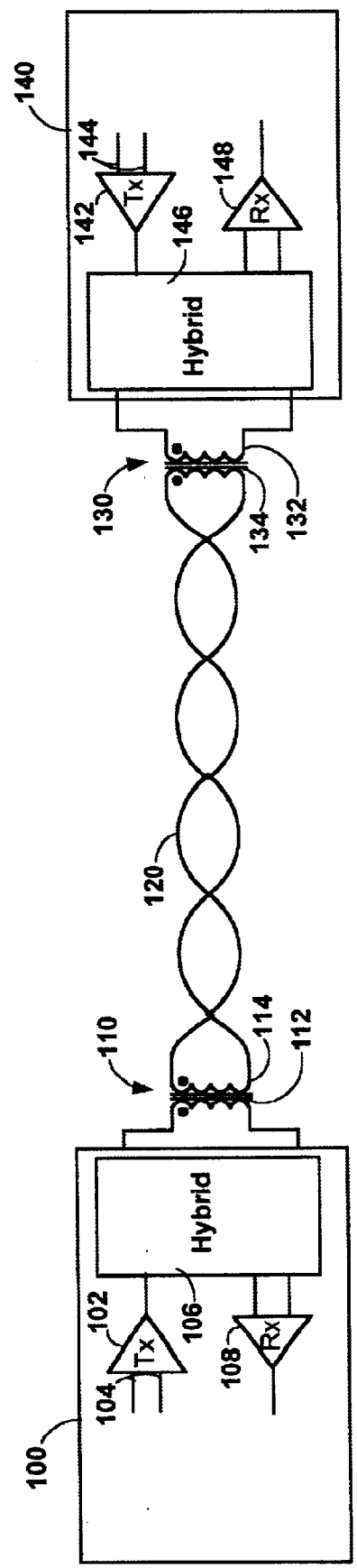
FIG. 1A is a prior art view of a hybrid and transformer combination interfacing with either end of a subscriber line.

FIG. 1A shows a prior art subscriber line coupling between two sites, e.g. a central office 100 and a remote terminal 140. The subscriber line 120 is coupled at opposing ends to the secondarys 114 and 134 of transformers 110 and 130 within the central office and remote terminal, respectively. The transformer 110 includes a primary winding 112 and a secondary winding 114. The primary winding 112 is coupled to the hybrid 106 which in turn interfaces with the output of the transmit line driver 102 and the input of amplifier 108 on the receive side. The input to the transmit line driver may be provided by an digital-to-analog (D/A) converter coupled to other transmit side circuitry (not shown). The output of the receive side amplifier may be coupled to an analog-to-digital (A/D) converter and other receive side circuits (not shown).

A similar configuration may exist on the remote terminal side as well. In the example shown the hybrid 146 is coupled to the primary winding 132. The hybrid interfaces with the output of the transmit line driver 142 and provides input to the amplifier 148 on the receive path. These in turn may be coupled to a corresponding A/D or D/A converters and associated circuitry.

Figure 1B:
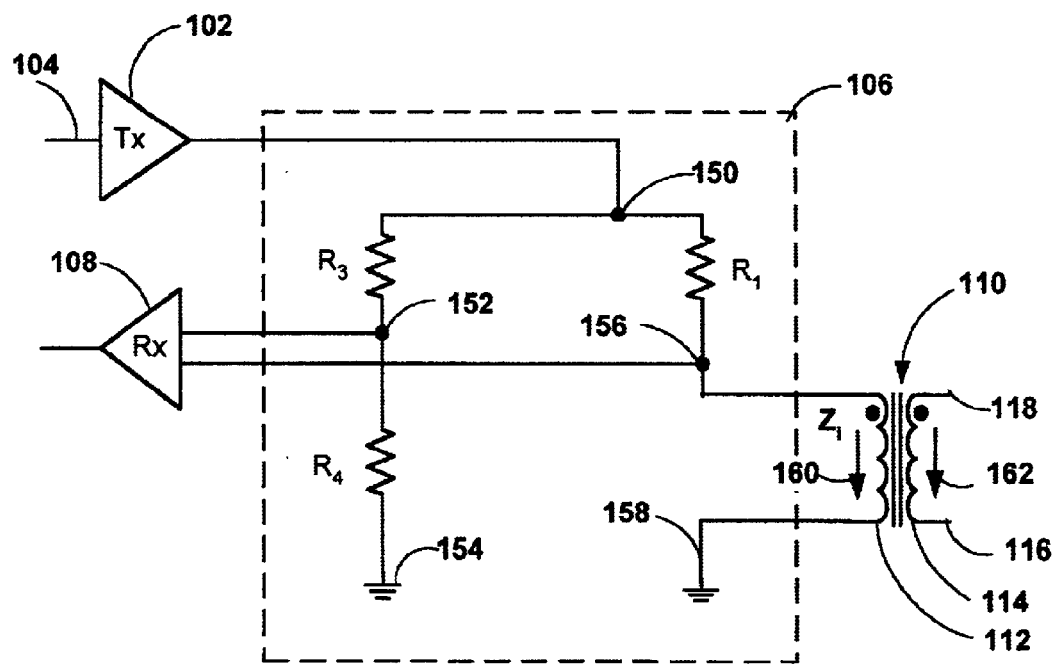
FIGS. 1B–C are detailed circuit diagrams of a prior art implementation of respectively a single-ended and a differential prior art hybrid.
Figure 1C:
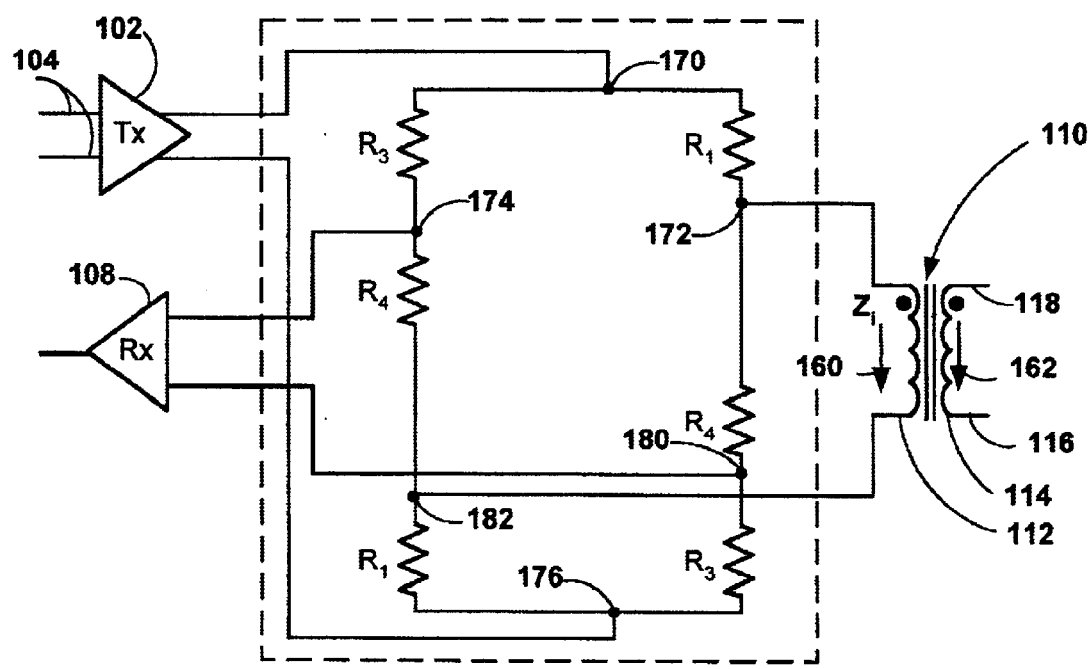

FIGS. 1B–C show alternate embodiments for either of the hybrids shown in FIG. 1A. FIG. 1B shows a single ended hybrid circuit. A single ended hybrid can be simplified into a classical electrical bridge with four branches. The transmitting path and the receiving path are connected at two diagonal ports (interfaces) while the twisted pair subscriber line is used as one of these branches through the coupling transformer. FIG. 1B is a detailed circuit diagram of such an equivalent circuit. The circuit includes a plurality of resistive elements arranged to form opposing sides of a balance circuit, in this case a resistive bridge. Resistive elements include both passive and active resistive elements e.g. resistors and inductors respectively. Series connected resistors $R_{3-4}$ are coupled on one end to a transmit interface 150 and on an opposing end to an electrical sink 154 and form a first side of the balance circuit. Series connected resistor $R_1$ and primary 112 are connected on one end to the transmit interface 150 and on an opposing end to the electrical sink 158 and form a second opposing side of the balance circuit. The output of the line driver 102 for the transmit path is coupled to the transmit interface 150. A receive interface is formed by connection 152, 156 made with either side of the balance circuit by the input to the receive amplifier 108. Connection 152 is located at the node between resistors $R_{3-4}$ on the first side of the balance circuit. Connection 156 occurs at the node between resistor $R_1$ and the primary inductor 112 of transformer 110. The secondary winding 114 of the transformer includes leads of 116–118 for connection to the subscriber line 120 (see FIG. 1A).

FIG. 1C shows a prior art differential hybrid circuit. A differential hybrid circuit can be simplified into a balance circuit of six resistive elements with six joints. The transmitting path, the receiving path and the twisted pair of telephone subscriber line are cross connected through a coupling transformer to the six joints of this balance network. In FIG. 1C a first and a second set of resistive elements are $R_{1,3,4}$ form opposing first and second sides of the balance circuit. Opposing ends of the balance circuit are coupled to the nodes 170, 176 which form the transmit interface. The first side of the balance circuit includes series connected resistors $R_3$, $R_4$ and $R_1$. The second side of the balance circuit includes series connected resistors $R_1$, $R_4$ and $R_3$. The receive interface is formed by nodes 174, 180 to either side of the balance circuit. These nodes are coupled to the inputs of the receive side amplifier 108. Node 174 lies on the first side of the balance circuit between resistors $R_{3-4}$. Node 180 lies on the opposite side of the balance circuit between resistors $R_{3-4}$. The primary inductor 112 of the transformer 110 also couples to either side of the balance circuit at nodes 172 and 182. Node 172 joins resistors $R_{1-4}$ on the second side of the circuit. Node 182 joins resistors $R_{1-4}$ on the second side of the circuit.

In either the prior art single ended or differential hybrid both the transmit and receive interfaces couple to the secondary 114 of the transformer 110 via a common primary winding 112. The disadvantage to this design is that signals received from the subscriber line are attenuated by the time they pass through the transformer and appear on the balance circuit. Such is not the case for the transmitted signals which are relatively more powerful when they are placed on the balance circuit. Thus, the receive signal is subject to a certain amount of cross talk and interference from the relatively more powerful transmit signal.

What is needed is a way to more evenly match the amplitudes of the receive and transmit signals. This may be achieved by varying the inductive coupling ratio between the transmit and receive interfaces and the secondary of the transformer. This allows the transmit and receive signals to be more amplitudes to be more evenly matched on the balance circuit thus avoiding cross talk and echo. The embodiments shown in the following figures and text disclose such methods and apparatus.

Single Ended Hybrid

Figure 2A:
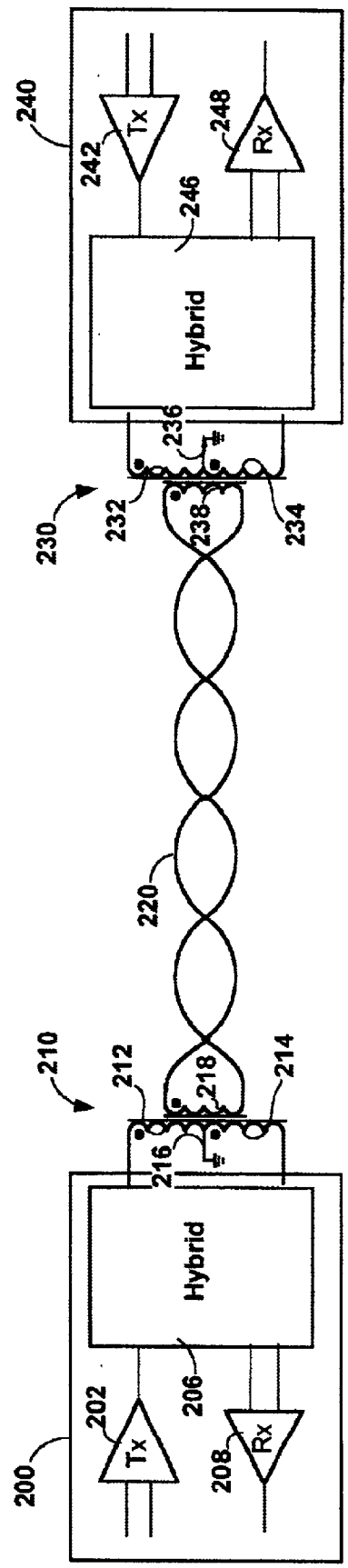
FIG. 2A shows a hybrid and transformer combination according to a single ended embodiment of the current invention interfacing with either end of a subscriber line.

FIG. 2A shows an embodiment of the current invention in which a single ended hybrid and transformer having a primary with a plurality of inductive portions is utilized to interface. to either or both ends of a subscriber line. In the embodiment shown the subscriber line 220 interfaces at opposing ends with the secondarys 218 and 238 of transformers 210, 230 respectively. Transformer 210 might for example be located at a central office and transformer 230 at a remote terminal. The central office 200 includes a transmit line driver 202, a receive amplifier 208, and the single-ended hybrid 206. The output of the transmit line driver provides the transmit signal to the single-ended hybrid 206. The receive signal is provided from the hybrid to the inputs of the receive path amplifier 208. On the subscriber line side the hybrid couples to opposing leads of the primary. The primary includes two inductive portions 212–214 joined by a tap intermediate the primary leads. In the embodiment shown the tap couples with an electrical sink. The remote terminal 240 exhibits a similar configuration though this need not be the case. The transmit line driver 242 provides a transmit signal to the input of the hybrid 246. The receive path amplifier accepts as inputs a receive signal provided by hybrid 246. On the subscriber line side, the hybrid 246 couples to opposing leads of the primary and specifically portions 232–234 of that primary. These portions are in turned coupled via tap 236 to an electrical sink or source. Transformer 230 includes a secondary winding 238 for which is coupled to the subscriber line 220.

Figure 2B:
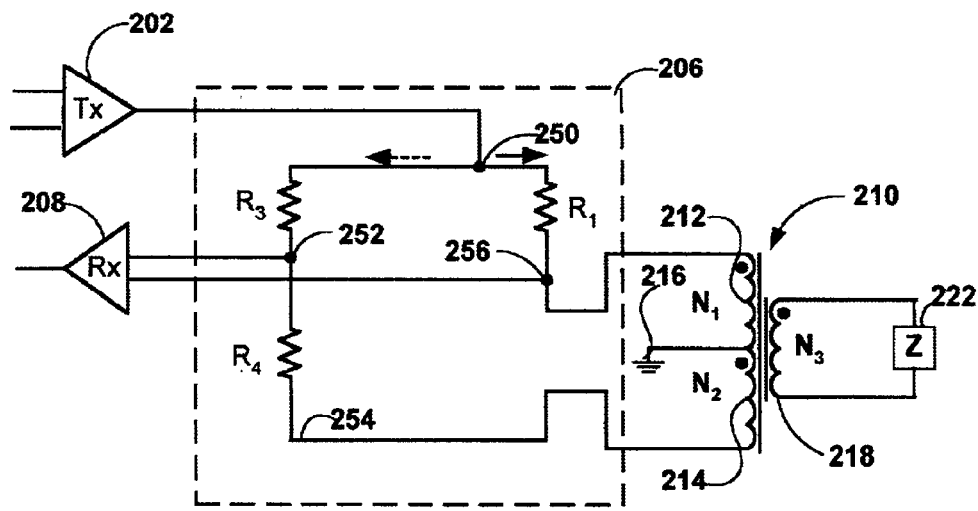
FIG. 2B is a detailed circuit diagram of the single-ended hybrid and transformer combination shown in FIG. 2A.

FIG. 2B shows a detailed circuit diagram of an embodiment of the single-ended hybrid 206 shown in FIG. 2A. The hybrid includes a plurality of resistive elements arranged to form opposing first and second sides of a balance circuit. Resistive elements exhibit resistance or reactance both of which have the same SI unit of measure, i.e. the ohm ($\Omega$). Resistive elements include passive elements such as resistors, capacitors or inductors or active elements such as an op amp. The first side of the balance circuit is comprised of series connected resistive elements $R_{3-4}$ coupled with the inductive portion 214 of the primary winding. The second side of the balance circuit includes series connected resistive element $R_1$ and inductive portion 212 of the primary winding. Opposing ends of the two sides of the balance circuit form the transmit interface. At one end of the balance circuit, the transmit interface node 250 is coupled with the output of the transmit path line driver 202. At the other end of the balance circuit the intermediate tap 216 forms the other node of the transmit interface and is coupled to an electrical sink. The receive interface includes nodes 252 and 256 on opposing sides of the balance circuit. Node 252 is located on the first side of the circuit between resistors $R_{3-4}$. Resistor R4 couples via lead 254 of inductive portion 214 of the primary winding of the transformer 210. Node 256 is located on the second side of the circuit between resistor $R_1$ and the lead of inductive portion 212 of the primary winding of the transformer. The subscriber line couples to the secondary 218 with a characteristic line impedance 222.

Figure 2C:
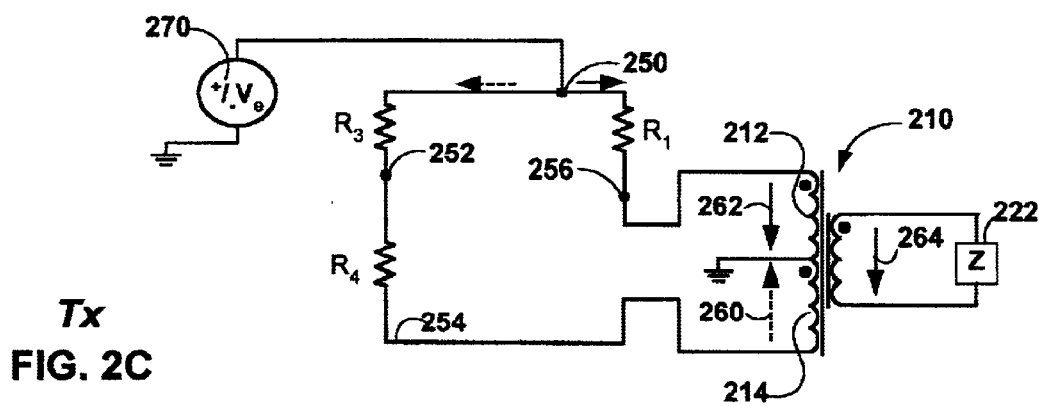
FIGS. 2C–D are equivalent circuits of the single ended hybrid shown in FIG. 2B for transmission and reception respectively.

FIG. 2C shows an equivalent circuit for the single ended hybrid and transformer combination shown in FIGS. 2A–B during generation of a transmit signal. A voltage source 270 provides the transmit signal to node 250 of the transmit interface. Current flows on opposing sides of the transmit path through both the corresponding resistive element(s) and through corresponding portions 212–214 of the primary inductor to the electrical sink. This generates opposing current flows 260–262 within the primary. The effect of this is to reduce the inductive coupling between the primary and secondary thus reducing the induced current 264 in the subscriber line. Thus, the effective turns ratio of the transformer 210, e.g. the ratio of the primary to the secondary turns is reduced.

Figure 2D:
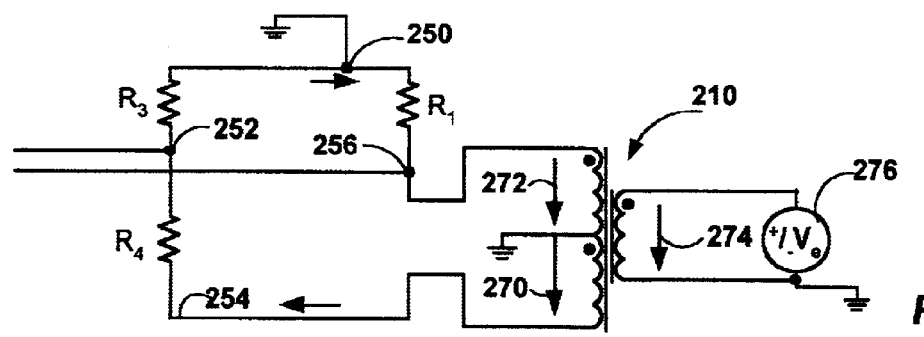

FIG. 2D shows the equivalent circuit during reception of a signal from a subscriber line. The subscriber line is modeled as driven by voltage source 276 coupled to the secondary winding 218 which generates a current 274 in the secondary. The received signal generates complimentary current flows 270–272 in the portions 214–212 of the primary winding, respectively. Thus the amplitude of the receive signal on the balance circuit is boosted relative to the transmitted signal. This cuts down on crosstalk and feedback between the transmit path and the receive path and does so inductively without the need for additional components or complexity and with the same linearity of amplification as the transformer.

Thus the novel single-ended hybrid geometry and primary with multiple inductive portions, allows the receive signal to be isolated from the transmit signal in the full duplex mode. This is achieved by increasing the inductive coupling between the primary and the secondary for the receive signal relative to the transmit signal. Thus the gain from the transmit port to the receive port is minimized and most of the energy is transmitted to the media.

The following equations show various combination of turns ratio and resistance values which may be implemented to change the relative coupling ratio of the transmit path signal and the receive path signal over the transformer 210.

Analysis: Single Ended Resistive Hybrid with Crossover Gain

The turns ratio of the transformer in the resistive hybrid can be used to trade between current and voltage for the transmit output. The shortcoming of this approach is that the receive input will also be reduced by the turns ratio of the transformer. A balance circuit and transformer with a primary with a plurality of inductive portions may be utilized to boost the receiver input voltage. This enhances the input voltage and lower the requirement of the receiver. FIG. 2B is an equivalent circuit of the single ended hybrid with crossover gain compensation. Equation 1 establishes the basic relationships between the resistor values $R_{1,3,4}$ the turns of the first and second portions of the primary $N_{1-2}$, the turns of the secondary $N_3$ and the characteristic line impedance 222 of the subscriber line 220.

$$(N_1 + N_2) \cdot N_1 \cdot \frac{R_3}{R_1} + N_1^2 \cdot \frac{R_4}{R_1} - \left(\frac{N_1^2}{R_1} + \frac{N_3^2}{Z}\right) \cdot R_4 = \qquad \text{Equation 1}$$

$$(N_1 + N_2) \cdot N_2$$

With the Equation 1 and line characteristic impedance 100 ohms, the following table shows different combination of turns ratio. The value of $V_1-V_2$ is the voltage across the receiver when a 1V source is presented at the subscriber line.

| Turns Ratio | | | R1 in ohm | Assume R3 = 1 k$\Omega$ R4 | V1 − V2 w/o compensation | V1 − V2 w/ compensation | Percentage Gain |
|---|---|---|---|---|---|---|---|
| N1 | N2 | N3 | | | | | |
| 1 | 1 | 2 | 25.00 | 1950.00 | 0.513 | 0.669 | 30.5% |
| 1 | 2 | 3 | 11.11 | 2933.33 | 0.333 | 0.503 | 50.8% |
| 1 | 3 | 4 | 6.25 | 3925.00 | 0.250 | 0.402 | 60.9% |

The single ended hybrid circuit can theoretically maintain the balance condition with the crossover gain compensation, so the echo return loss is still at its minimum.

The following is a chart to show the transmit to subscriber line insertion loss by the hybrid circuit when the gain compensation circuit is presented. It is assumed that a 1V voltage source is presented at the transmit input. Without the compensation circuit, the voltage across the primary side of the transformer will be 0.5 V.

| Turns Ratio | | | R1 in ohm | Assume R3 = 1kΩ R4 | VA | Voltage across PRI N1 × VA | Insertion loss by the hybrid in dB |
|---|---|---|---|---|---|---|---|
| N1 | N2 | N3 | | | | | |
| 1 | 1 | 2 | 25.00 | 1950.00 | 0.494 | 0.494 | −0.111 |
| 1 | 2 | 3 | 11.11 | 2933.33 | 0.492 | 0.492 | −0.148 |
| 1 | 3 | 4 | 6.25 | 3925.00 | 0.491 | 0.491 | −0.149 |

Differential Hybrid

Figure 3A:
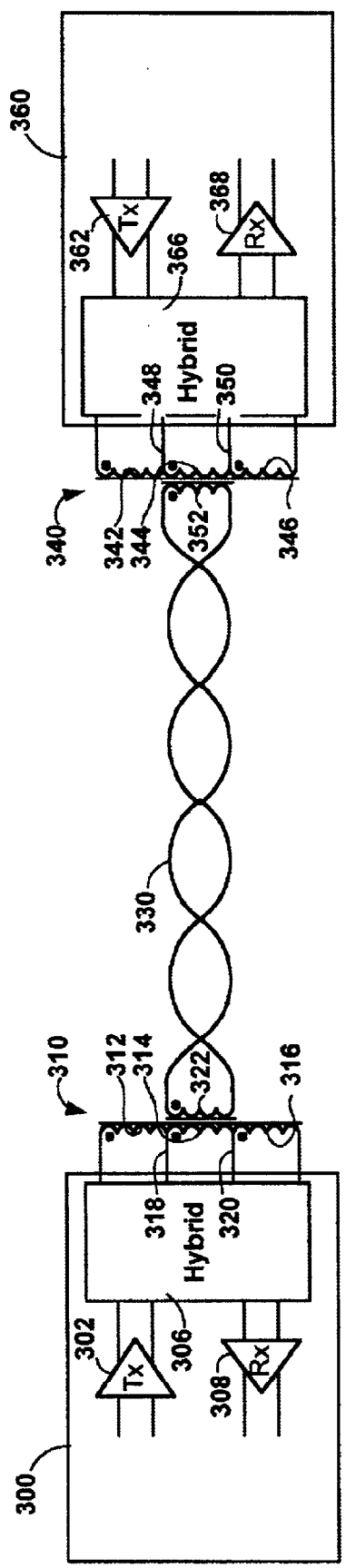
FIG. 3A shows a differential hybrid and transformer combination coupled to either end of a subscriber line in accordance with the current invention.

FIG. 3A shows an embodiment of the current invention in which a differential hybrid couples to a transformer with a primary which includes a plurality of inductive portions. Subscriber line 330; transformers 310, 340; central office 300 and remote site 360 are shown. The transformer 310 includes a secondary 322 coupled to the subscriber line 330 and a primary which includes, in the embodiment shown, three inductive portions 312–316. As is the case in the single-ended embodiment, the inductive portions could be formed by distinct windings or by a continuous winding with taps. In the embodiment shown, the primary comprises a continuous winding with, in this case, two intermediate taps 318–320 which split the primary into its three respective portions. The primary couples to the hybrid 306 in a manner which will be described and discussed in greater detail in the following FIG. 3B. The output of a differential line driver 302 provides a transmit signal to the hybrid 306. The hybrid outputs a received signal to the input of the differential amplifier 308 in the receive path. On the remote terminal side, a similar configuration is shown. Transformer 340, which includes a secondary 352, coupled to the subscriber line and a primary with three portions 342–346 defined by intermediate taps 348–350. Opposing ends of the primary and the intermediate taps coupled to the hybrid 366. The hybrid in turn couples with the output of the transmit path line driver 362 and the input of the receive path amplifier 368. As will be obvious to those skilled in the art it need not be the case that the circuitry on one end of the subscriber line mirror that on the other. One end might be coupled to a prior art hybrid while the other to a single-ended or differential hybrid according to the current invention. Alternately, a single-ended hybrid and a differential hybrid, both in accordance with the current invention, might be coupled to either end of the subscriber line.

Figure 3B:
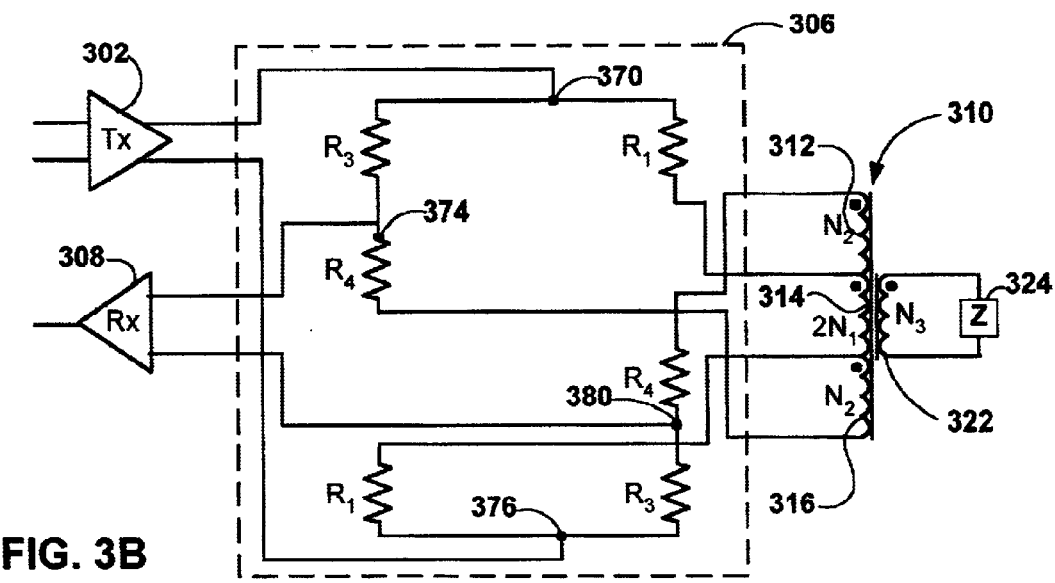
FIG. 3B is a detailed circuit diagram of the differential hybrid and transformer shown in FIG. 3A.

FIG. 3B shows an equivalent circuit for the differential hybrid shown in 306 shown in FIG. 3A That hybrid includes a balance circuit with opposing sides each of which includes a series combination of a first and a second set of resistive elements, e.g. resistors $R_{1,3,4}$, as well as a series connection to a corresponding one of the inductive portions 312–316 of the primary of transformer 310. Resistive elements exhibit resistance or reactance both of which have the same SI unit of measure, i.e. the ohm (Ω). Resistive elements include passive elements such as resistors, capacitors or inductors or active elements such as an op amp. On a first side of the balance circuit a series combination is provided between node 370 of the transmit interface and transistors $R_{3-4}$, inductive portion 316 of the primary, resistor $R_1$, and node 376 of the transmit interface. Nodes 370 and 376 of the transmit interface couple to the output of transmitter 302. On the second side of the balance circuit a series connection is provided between transmit interface node 370, resistor $R_1$, inductive portion 312 of the primary, resistors $R_{4-3}$ and transmit interface node 376.

The receive interface includes nodes 374 and 380 and opposing sides of the balance circuit intermediate resistors $R_{3-4}$. These nodes couple to the input of the receive path amplifier 308. Finally the center portion 314 of the primary is coupled with opposing sides of the balance circuit to the corresponding resistor $R_1$. The secondary 322 couples to the subscriber line which exhibits a characteristic line impedance 324.

Figure 3C:
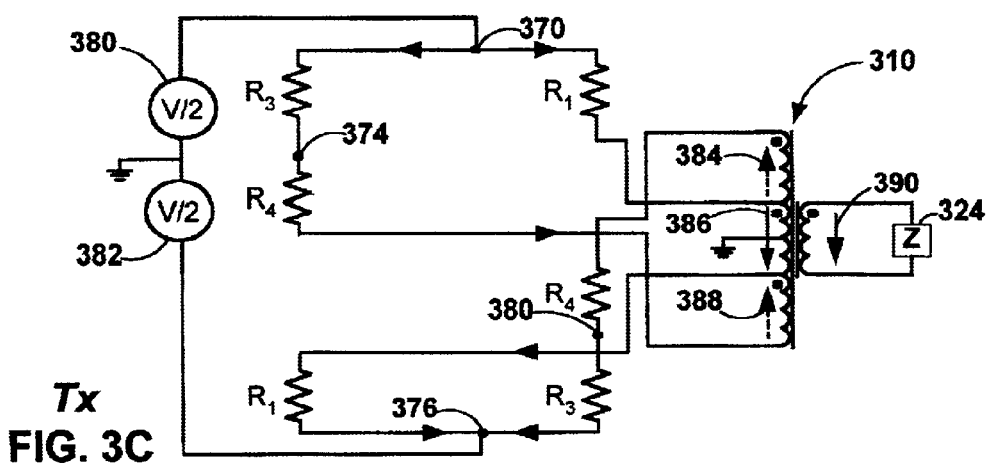
FIGS. 3C–D are equivalent circuits for the differential hybrid shown in 3B for transmission and reception respectively.

FIG. 3C shows the equivalent circuit to FIG. 3B during generation of a transmit signal. The transmit line driver has been replaced by two voltage sources 380–382 with a common connection to an electrical sink. These voltage sources drive the two nodes 370, 376 which form the transmit interface. The transmit signal follows parallel paths down opposing side of the balance circuit. The current flows 384–388 in the corresponding portions 312–316 of the primary oppose one another thereby reducing the effective coupling ratio between the primary and the secondary for the transmit signal. The resultant current flow 390 in the secondary is shown. Thus the actual physical turns ratio of the primary and the secondary does not correspond with the effective current ratio for the transmit path.

Figure 3D:
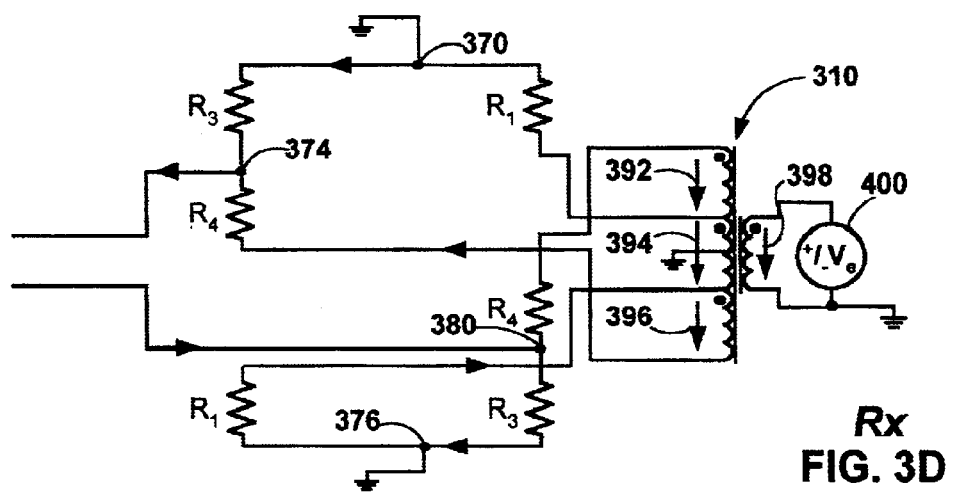

As is shown in FIG. 3D the opposite effect takes place on the receive path in which all current flow 398 generated by the receive signal shown as a voltage source 400, drives the secondary in a manner which generates complimentary current flows 392–396 in the corresponding portions 312–316 of the primary. Thus, the actual physical turns ratio of the primary and secondary corresponds with the effective current ratio for the receive path. The effective coupling ratio for the receive path differs from that of the transmit path and provides for reduction in cross talk and echo.

Analysis: Differential Resistive Hybrid with Crossover Gain Compensation

The following analysis is for the differential resistive hybrid with the crossover gain circuit. In the traditional differential resistive hybrid circuit, both the transmit and receive share the same transformer for impedance matching. Therefore, the turns ratio of the transformer will affect both the transmit output and receive input. With the differential hybrid of the current invention coupled with a transformer with a plurality of inductive portion, the receive input will increase without affecting the transmit path and the transhybrid loss. FIG. 3B, as discussed above, shows the equivalent circuit of the differential hybrid with crossover gain. Equation II establishes the basic relationships between the resistor values $R_{1,3,4}$ the turns of the first, second and intermediate portions of the primary $N_{1,2}$, the turns of the secondary $N_3$ and the characteristic line impedance of the subscriber line 324.

$$R_3 = \frac{R_4 \cdot (N_3^2 \cdot R_1 + 2 \cdot N_1^2 \cdot Z) + 2 \cdot (N_1 + N_2)^2 \cdot Z \cdot R_1}{2 \cdot Z \cdot N_1 \cdot (N_1 + N_2)} \quad \text{Equation II}$$

With Equation II and line characteristic impedance 100 ohms, the following table shows different combination of turns ratio. The value of $V_1-V_2$ is the voltage across the receiver when a 1V source is presented at the subscriber line 330.

| Turns Ratio | | | R1 in | Fixed | | V1 − V2 w/o compensation | V1 − V2 w/ compensation | Percentage |
|---|---|---|---|---|---|---|---|---|
| N1 | N2 | N3 | ohm | R3 | R4 | | tion | Gain |
| 0.5 | 0 | 1 | 50.00 | 2050.00 | 1000.00 | 0.672 | 0.672 | 0.00% |
| 0.5 | 0.5 | 2 | 12.50 | 1025.00 | 1000.00 | 0.333 | 0.506 | 51.85% |
| 0.5 | 1 | 3 | 5.56 | 683.33 | 1000.00 | 0.222 | 0.406 | 82.67% |
| 0.5 | 1.5 | 4 | 3.13 | 512.50 | 1000.00 | 0.167 | 0.339 | 103.31% |

The overall output voltage to the receiver is increased substantially; therefore, the design of the AFE for the receiver is less restricted. The next table shows the tradeoff of the transmit to media loss by this compensation circuit.

| Turns Ratio | | | R1 in | Fixed | | | Voltage across PRI | Insertion loss by hybrid |
|---|---|---|---|---|---|---|---|---|
| N1 | N2 | N3 | ohm | R3 | R4 | VA | 2 × N1 × VA | in dB |
| 0.5 | 0.5 | 2 | 12.50 | 1025.00 | 1000.00 | 0.488 | 0.488 | −0.214 |
| 0.5 | 1 | 3 | 5.56 | 683.33 | 1000.00 | 0.488 | 0.488 | −0.214 |
| 0.5 | 1.5 | 4 | 3.13 | 512.50 | 1000.00 | 0.488 | 0.488 | −0.214 |

Based on the calculations, the insertion loss of the gain compensation circuit will be about 0.214 dB. This loss is very insignificant comparing with the advantage at the receiver input.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intendedthat the scope of the invention be defined by the following claims and their equivalents.

What is claimed is:

1. A hybrid circuit for communicating a transmit signal and a receive signal across a subscriber line, and the hybrid circuit comprising:
    a transformer with a primary inductor and a secondary inductor and the secondary inductor for coupling to the subscriber line and the primary inductor including at least two inductive portions;
    a balance circuit with a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal; wherein said balance circuit and transformer provide one of a single-ended hybrid and a differential hybrid.

2. The hybrid circuit of claim 1, wherein the at least one tap of the primary inductor of said transformer further comprises a coupling with an electrical sink.

3. The hybrid circuit of claim 1, wherein the at least one tap of the primary inductor of said transformer further comprises a coupling with the transmit interface.

4. A hybrid circuit for communicating a transmit signal and a receive signal across a subscriber line, and the hybrid circuit comprising:
    a transformer with a primary inductor and a secondary inductor and the secondary inductor for coupling to the subscriber line and the primary inductor including: a first lead and a second lead at opposing ends of a primary inductor, and a first tap and a second tap between said first and said second lead and a first inductive portion defined between said first lead and said first tap, and a second inductive portion of said at least two inductive portions defined between said first tap and said second tap, and a third inductive portion of said at least two inductive portions defined between said second tap and said second lead; and
    a balance circuit with a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal.

5. A hybrid circuit for communicating a transmit signal and a receive signal across a subscriber line, and the hybrid circuit comprising:
    a transformer with a primary inductor and a secondary inductor and the secondary inductor for coupling to the subscriber line and the primary inductor including at least two inductive portions;
    a balance circuit with a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal wherein said balance circuit further provides:
        a plurality of resistive elements conductively coupled to form at least a first electrical path and a second electrical path with the first electrical path including a first inductive portion of the at least two inductive portions and the second electrical path including a second inductive portion of the at least two inductive portions and the first electrical path and the second electrical path coupled at opposing ends to the transmit interface and the receive interface coupled to both said first electrical path and said second electrical path.

6. The hybrid circuit of claim 5, wherein said plurality of resistive elements include at least one of: a resistor and an inductor.

7. A hybrid circuit for communicating a transmit signal and a receive signal across a subscriber line, and the hybrid circuit comprising:
    a transformer with a primary inductor and a secondary inductor and the secondary inductor for coupling to the subscriber line and the primary inductor including at least two inductive portions;
    a balance circuit with a transmit interface to input the transmit signal and a receive interface to output the receive signal, and the balance circuit coupling both the transmit interface and the receive interface with the at least two inductive portions of the primary to change the relative magnitude of an induced emf between the primary and the secondary for the transmit signal and the receive signal, wherein said balance circuit further provides:

a plurality of resistive elements conductively coupled to form at least a first electrical path and a second electrical path with the first electrical path including a first inductive portion of the at least two inductive portions and the second electrical path including a second inductive portion of the at least two inductive portions and the first electrical path and the second electrical path coupled at opposing ends to the transmit interface and a third inductive portion of the at least two inductive portions coupled to both the first electrical path and the second electrical path, and the receive interface coupled to both said first electrical path and said second electrical path.

8. The hybrid circuit of claim 7, wherein said plurality of resistive elements include at least one of a resistor and an inductor.

9. A method for communicating a transmit signal and a receive signal across a subscriber line, and the method for communicating comprising the acts of:

forming at least a first inductive coupling and a second inductive coupling with the subscriber line;

coupling a plurality of resistive elements to form opposing sides of a balance circuit with opposing ends, and with each of the opposing sides including a corresponding one of the first inductive coupling and the second inductive coupling;

interfacing with the opposing sides of the balance circuit to form a receive interface for outputting the receive signal and the receive interface exhibiting a first induced emf resulting from the receive signal on the subscriber line; and interfacing with opposing ends of the balance circuit to form a transmit interface for inputting the transmit signal and the transmit interface exhibiting a second induced emf on the subscriber line resulting from the transmit signal and the first induced emf differing in magnitude relative to the second induced emf and wherein the first induced emf is less than the second induced emf.

10. A method for communicating a transmit signal and a receive signal across a subscriber line, and the method for communicating comprising the acts of:

forming at least a first inductive coupling and a second inductive coupling with the subscriber line;

coupling a plurality of resistive elements to form opposing sides of a balance circuit with opposing ends, and with each of the opposing sides including a corresponding one of the first inductive coupling and the second inductive coupling;

interfacing with the opposing sides of the balance circuit to form a receive interface for outputting the receive signal and the receive interface exhibiting a first induced emf resulting from the receive signal on the subscriber line; and interfacing with opposing ends of the balance circuit to form a transmit interface for inputting the transmit signal and the transmit interface exhibiting a second induced emf on the subscriber line resulting from the transmit signal and the first induced emf differing in magnitude relative to the second induced emf and wherein the first induced emf is greater than the second induced emf.

11. A method for communicating a transmit signal and a receive signal across a subscriber line, and the method for communicating comprising the acts of:

forming at least a first inductive coupling, a second inductive coupling and a third inductive coupling with the subscriber line;

coupling a plurality of resistive elements to form opposing sides of a balance circuit with opposing ends, and with each of the opposing sides including a corresponding one of the first inductive coupling and the second inductive coupling;

interfacing with the opposing sides of the balance circuit to form a receive interface for outputting the receive signal and the receive interface exhibiting a first induced emf resulting from the receive signal on the subscriber line; and interfacing with opposing ends of the balance circuit to form a transmit interface for inputting the transmit signal and the transmit interface exhibiting a second induced emf on the subscriber line resulting from the transmit signal and the first induced emf differing in magnitude relative to the second induced emf.

12. The method for communicating of claim 11, further comprising the act of:

interfacing the third inductive coupling to both opposing sides.

* * * * *